Jan. 7, 1941.　　　R. E. WAGNER　　　2,228,191
WATER HEATING AND INCINERATING APPARATUS
Filed Feb. 11, 1938　　　4 Sheets-Sheet 1

INVENTOR.
ROBERT E. WAGNER
BY
ATTORNEY.

INVENTOR.
ROBERT E. WAGNER
BY
ATTORNEY.

Patented Jan. 7, 1941

2,228,191

UNITED STATES PATENT OFFICE 2,228,191

WATER HEATING AND INCINERATING APPARATUS

Robert E. Wagner, Rochester, N. Y., assignor of one-half to Emil Muller, Rochester, N. Y.

Application February 11, 1938, Serial No. 190,117

3 Claims. (Cl. 122—2)

My present invention relates in part to water heating appliances and in part to the burning of garbage, paper and similar refuse, the idea being that the heat generated by the combustion of the last mentioned materials may be applied, in a single system, to raising the temperature of a body of water for domestic purposes in home equipment or the like. The object of the invention, in general, is to provide a simple and attractive water heater that can be furnished at low cost and in which a primary burner insures the heating of the water at all necessary times while a secondary burner adapted for refuse has its contents dehydrated by the products of combustion of the primary burner. When the residue of solid combustibles is ignited, it contributes its heating capabilities whereby the self-same body of water is raised in temperature adequately and with a minimum of heating expense both by such original source of heat and the accumulations due to the combustion of the refuse. To these and other ends, the invention resides in certain improvements and combinations of parts, all as will be hereinafter more fully described, the novel features being pointed out in the claims at the end of this specification.

In the drawings.

Similar reference numerals throughout the several views indicate the same parts.

Figure 2:
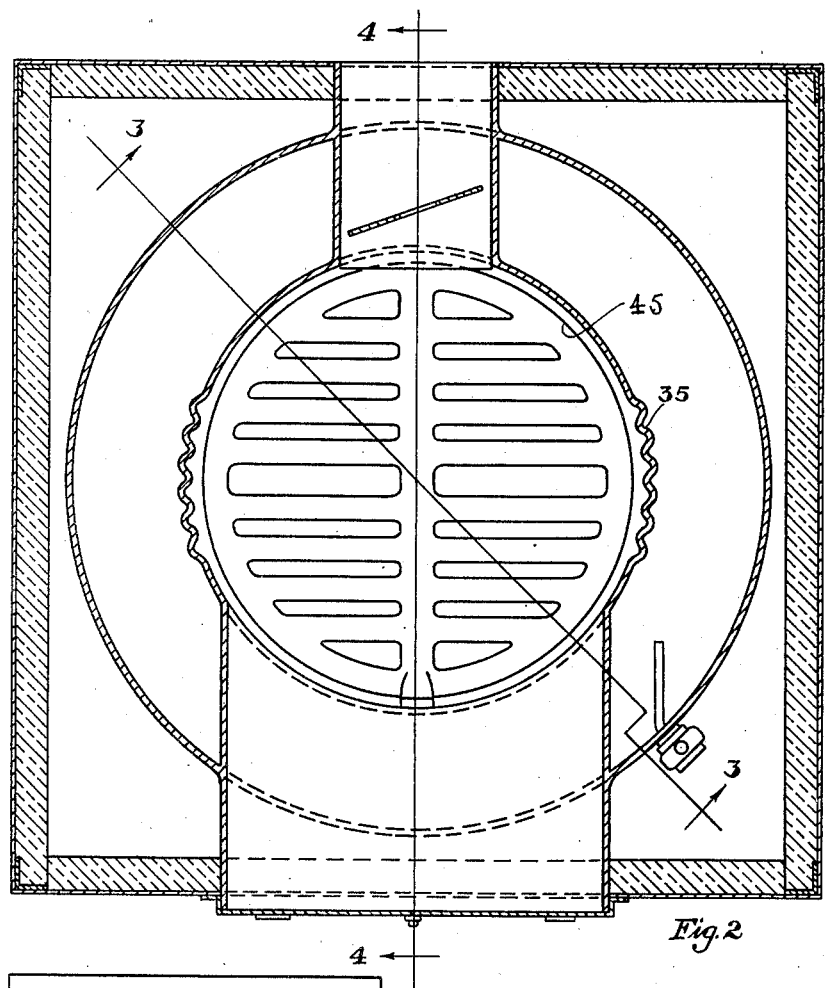
Fig. 2 is a horizontal section therethrough taken substantially on the line 2—2 of Fig. 1, the object being to show the water jacket and casing in section and the refuse supporting grate in top plan view.
Figure 1:
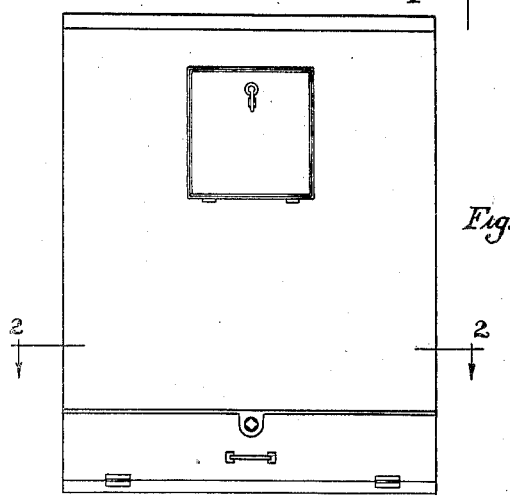
Fig. 1 is a front elevation of an equipment constructed in accordance with and illustrating one embodiment of my invention.

To first give a general idea of the construction and mode of operation of the device illustrated as an embodiment of my invention, it comprises a fire pot submounted with a grate and provided with a door for the introduction of combustible or partly combustible refuse. Leading therefrom is a flue or smoke pipe outlet in the manner of an ordinary furnace. This fire pot is preferably in the form of a dome that is surrounded at the sides and across the top with a water jacket. Outside of the water jacket is an insulated casing encompassing the whole unit for the conservation of contained heat.

In incinerating devices of this kind, materials of various natures are introduced for disposal, some of which are inherently combustible and some of which become combustible only when dehydrated, as, for instance: in the first place, there are introduced as refuse rags, paper, wood, etc.; in the second place, garbage and accompanying matter containing a high percentage of water and not ordinarily susceptible to burning.

It is contemplated by the construction and mode of operation of the present invention that the waste matter aforesaid shall be dumped indiscriminately into the fire pot surrounded by the water jacket. I make arrangements whereby the body of this water jacket is heated by the combustion of such refuse in any event, but I also provide a direct heater for the water having gaseous products of combustion which, in the process of heating the water content of the jacket, circulate through the mass of refuse material in the main fire pot. The refuse so becomes dehydrated and rendered more susceptible to combustion on its own account and that combustion and the heat generated thereby will be communicated to the water content of the surrounding jacket.

Referring more particularly to the drawings, 1 indicates in general an insulated outside casing of metal and/or such other composites as are suitable and of a shape that will adapt itself to kitchen or other domestic space and equipment. Within this housing is a boiler 2 of a nature adapted to surround a fire pot 3 having a dome 4 at the top. The said jacket spans the top of the fire pot as shown and extends downwardly at the sides being sealed at the points 5 and 6 in a suitable manner, at which points it forms seams with a bottom jacket wall 7.

From this it will clearly appear that any burnings that occur in the firepot 3 will be radiated to the jacket 2 and the heat absorbed by the water content thereof.

A chute 8 closed by a suitable fire door 9 delivers material inserted through the latter into the fire pot 3 upon a grate 10. The particular construction and mode of operation of this grate is not material to the present invention, the same being illustrated conventionally as is an ash pit 11 within the casing below the said grate, access to which is had by a suitable ash pit door 12.

With this arrangement, it is obvious that combustible matter inserted through 8 and 9 into the combustion chamber 3 and upon grate 10 will be consumed with the entrance of air through door 12 or otherwise. The products of combustion, in the present embodiment, pass out through a smoke pipe 13 controlled by a damper 14 opposite to inlet 8 and both being shown conventionally in the manner of any furnace.

It will be assumed, for present objects and as first above mentioned, that the water jacket 2 is for the purpose of heating water for household use. This being the case, the take-off or drain is naturally at the top of jacket 2 and as indicated at 15 in Fig. 3. The intake or cold water supply is at a lower point indicated at 16 in Fig. 3.

Figure 3:
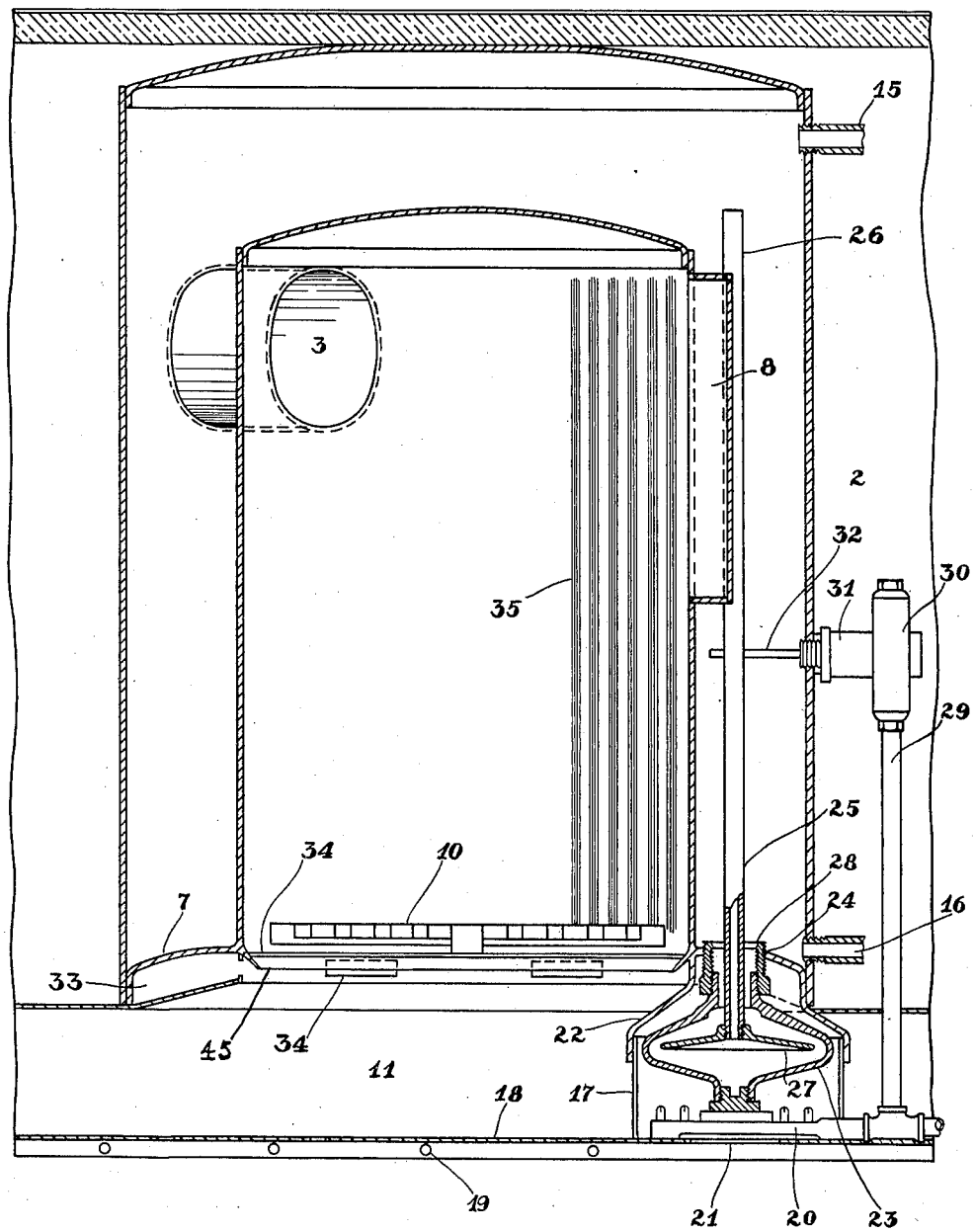
Fig. 3 is a vertical section taken substantially on the line 3—3 of Fig. 2 but showing devices not attempted to be shown in Fig. 2.
Figure 4:
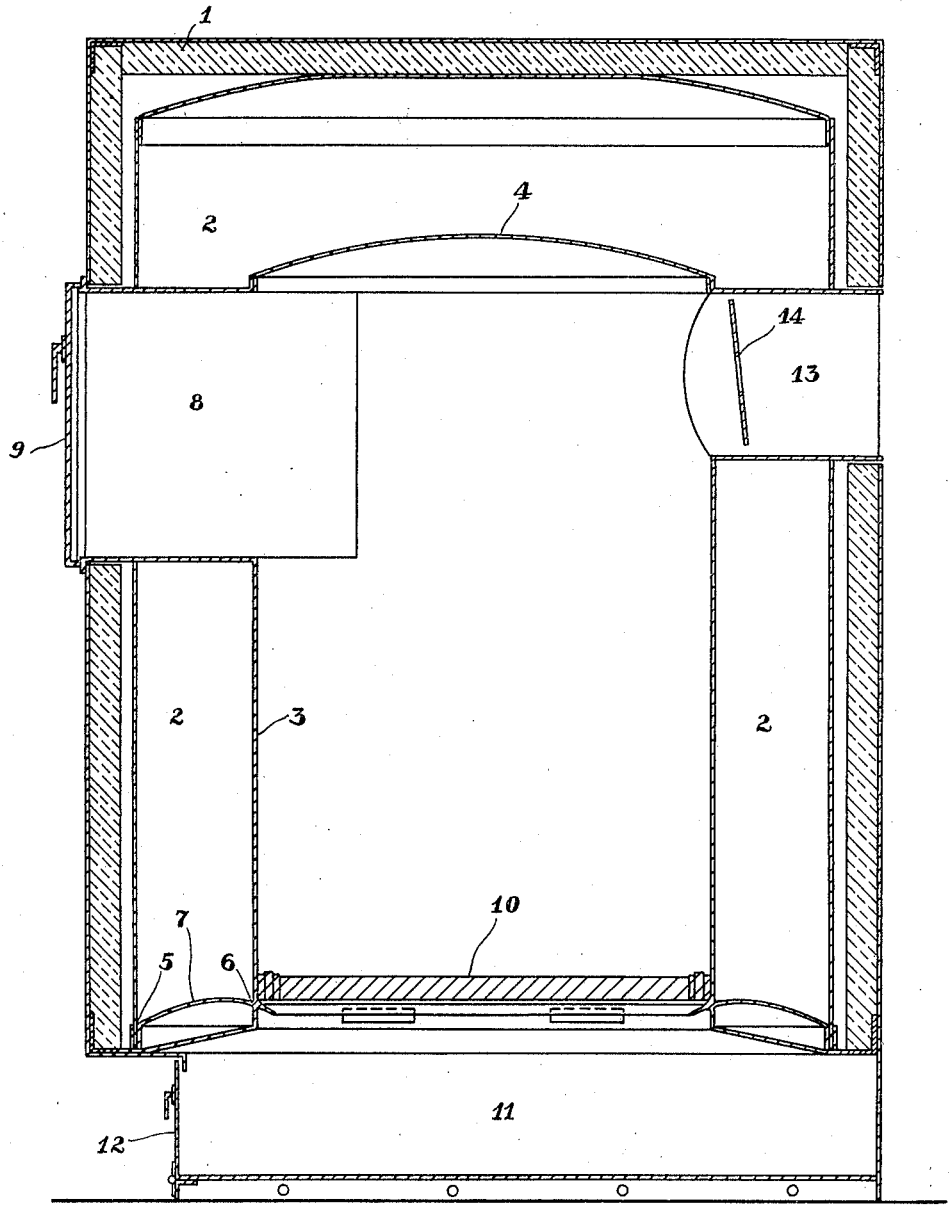
Fig. 4 is a transverse vertical section taken substantially on the line 4—4 of Fig. 2.

Referring now to the other than refuse heating capabilities of my boiler, I first refer to the embodiment shown in Fig. 3 specifically. There is there shown a compact form of gas burner particularly suitable for the purpose and embodying a casing 17 offset to one side of the ash pit 11 and resting upon the raised floor 18 thereof. Air is admitted through openings 19 beneath the flooring and reaches a burner 20 within the casing through an opening 21 in the flooring beneath the latter. A dome 22 constitutes the top of the burner casing and is suitably sealed into the bottom wall 7 of the jack 2. Above the burner is a small boiler or kettle 23 of large surface in proportion to its capacity, which kettle at the top through a connection 24 in the jacket wall 7 leads into the bottom of jacket 2. Extending vertically through this connection and in spaced relationship to leave a surrounding passage 26 is a pipe 25 with a mouth 26 delivering at an elevated point within the jacket 2. The lower end of the pipe is fitted with a baffle disk 27. The operation of this element is as follows:

From the intake or cold water supply 16 delivering to the bottom of the jacket, the water passes down into the kettle at 28, around the pipe 25, is dispersed by the baffle 27 to flow evenly around the walls of the kettle, is heated thereby from the burner 20 and rises through the pipe 25 to the top of the jacket. Or, if water is not being drawn, of course, the cooler water in the jacket takes the same course, thereby raising the average temperature of the whole jacket.

Gas is supplied to the burner 20 by suitable connections through a supply pipe 29 having a suitable automatic valve 30 under the control of a thermostatic actuator 31. These may be any of the available well-known types and the burner is thus sensitive to a thermostatic element 32 arranged in the jacket 2 at a height that will normally maintain the desired maximum temperature.

The present invention is concerned particularly with the products of combustion accumulating within the casing 17 from the burner 20. These are led into an annular chamber 33 beneath the jacket 2 and formed partly by the jacket wall 7, of which annular chamber the dome 22 of the burner casing is a part. They escape with uniform distribution through a number of ports or flue openings 34 into the ash pit 11. More particularly, they escape beneath the grate 10 and find their way up through the refuse in the main fire pot 4 to ultimately pass out through the smoke pipe 13 along with the moisture that they collect or vaporize from the refuse. The chamber 33 is contiguous to and in heat-transferring relationship to the bottom wall 7 of the water jacket and the openings 34 are in part at least remote from the burner so that the gases collected in chamber 33, in order to issue through 34, must traverse the chamber, additionally directly heating the jacket. At the lower rim of the fire pot beneath the grate are inwardly and downwardly inclined flanges 45 acting as ash sheds to prevent droppings from the grate from fouling the chamber 33 through the gas distributing discharge openings 34.

At this point, it is to be noted that I prefer to provide the lateral walls 3 of the fire pot interiorly with corrugations 35 or equivalent irregularities so that refuse such as garbage cannot, in extreme instances, pack so closely against them as to make the entire contained body in the fire pot impervious to the passage and dehydrating activity of the gas fumes.

When the refuse contents of the fire pot have become sufficiently dry to support combustion, they will either ignite from the gas fumes from chamber 33 or may be otherwise kindled in any of the ways ordinarily employed in a domestic incinerator.

Figure 5:
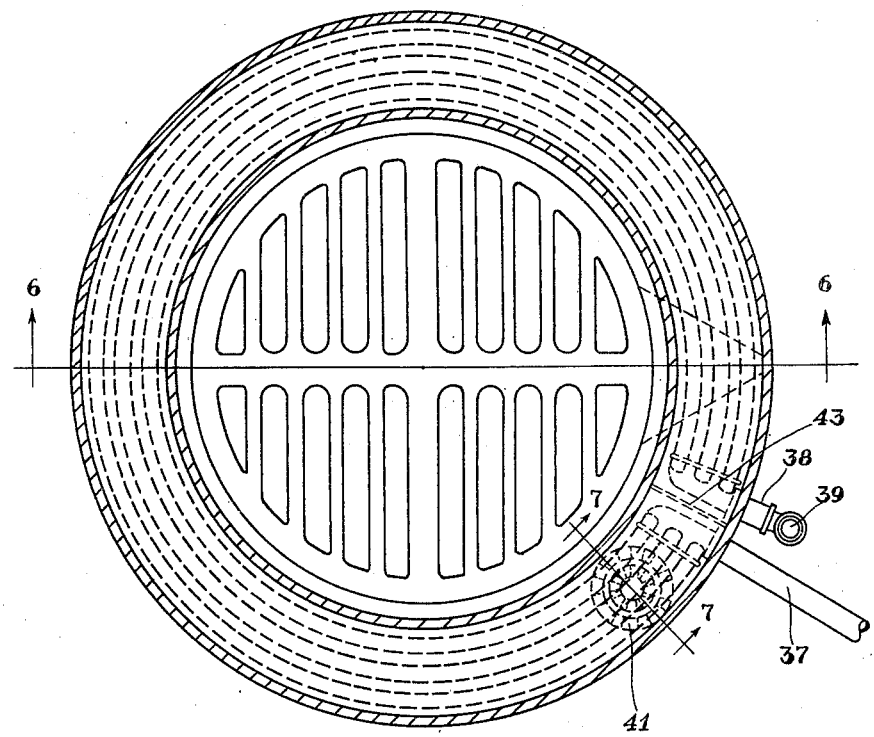
Fig. 5 is a horizontal detail section taken in a plane just above the grate bar of the refuse burning chamber of a modification of the invention.
Figure 6:
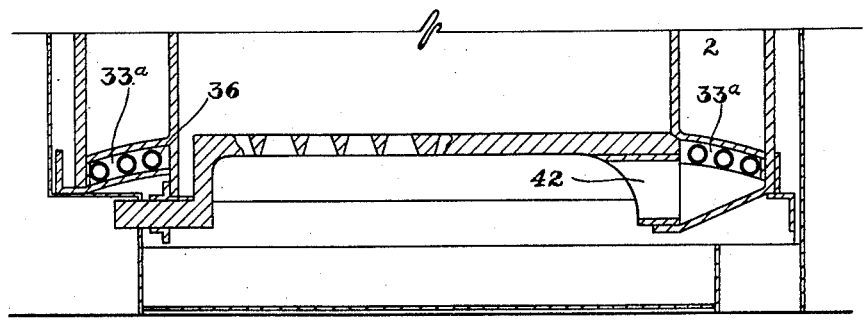
Fig. 6 is a vertical section of this modification taken substantially on the line 6—6 of Fig. 5.
Figure 7:
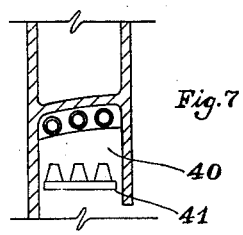
Fig. 7 is a detail section taken substantially on the line 7—7 of Fig. 5.

In Figs. 5, 6 and 7, in the matter of the gas heater, in that embodiment the major elements of the general structure are substantially the same and bear the same reference numerals on the drawings, but instead of the kettle arrangement, I provide in an annular chamber 33a corresponding to chamber 33 a plurality of pipe rings 36. At one end, each of these pipes is connected to an inlet or cold water supply 37, while at the other end and adjacent thereto they terminate in a connection 38 to a vertically disposed pipe 39 on the outside of the jacket that is run into the same (at a point not illustrated) at a level similar to the discharge level 26 of pipe 25. In a compartment 40 adjacent to the ash pit they are exposed to the flames of a gas burner 41 receiving air from the ash pit or otherwise. The burner is arranged at the intake end of the rings, as shown in Fig. 5, to act upon the colder water as it enters. The products of combustion traverse the annular chamber 33a in the same direction that the water takes on its way to discharge pipe 39, thus continuously heating it. Adjacent to the connection 38, a flue 42 discharges into the fire pot beneath the grate as before, the provision of which flue is shown worked into the construction of the fire pot grate. A transverse baffle wall 43 shown in dotted lines in Fig. 5 arranged between the connections 37 and 38 prevents the products of combustion from the burner 41 from taking a course other than the long way around through chamber 33a to the flue 42. The water intake 37 is to be understood as being from either an original source of supply or from a low point in the jacket 2 as a matter of internal circulation.

An incinerator boiler constructed in accordance with my invention can be produced at a relatively low cost making it available for purchase and use by the average householder; it can be accommodated nicely in the average home, and it at least partially converts the nuisance of rubbish disposal into a saving on the item of fuel.

I claim as my invention:

1. In a water heater, the combination with a fire pot adapted for use as a refuse incinerator and having a water jacket and a grate, of a burner arranged below the grate, a water heater served by the burner and having circulatory water connections with the jacket, and walls forming a gas chamber contiguous to and in direct heat transfer relationship with the bottom of the jacket which collects the hot gases of combustion from the burner and has an opening directing said gases beneath the grate.

2. In a water heater and incinerator, the combination with a fire pot adapted for use as a refuse incinerator and having a water jacket and a grate, and a burner arranged below the grate, a water heater served by the burner and having circulatory water connections with the jacket, of means for collecting the hot gases of combustion from the burner and directing them to the fire pot, said means comprising a chamber beneath and contiguous to the jacket and surrounding the grate and provided with an inward opening remote from the burner, said burner being located in said chamber.

3. In a water heater, the combination with a fire pot adapted for use as a refuse incinerator and having a water jacket and a grate, of a burner, means for collecting the hot gases of combustion from the burner and directing them beneath the grate, said means comprising walls forming a chamber beneath and contiguous to the jacket and surrounding the grate and provided with a plurality of inward openings, and an ash shedding flange at the bottom of the fire pot protecting the openings from fouling, said burner being located in said chamber.

ROBERT E. WAGNER.